Sept. 26, 1933.    J. L. DRAKE    1,928,371
PROCESS AND APPARATUS FOR PRODUCING SHEET GLASS
Filed May 13, 1929    4 Sheets-Sheet 4
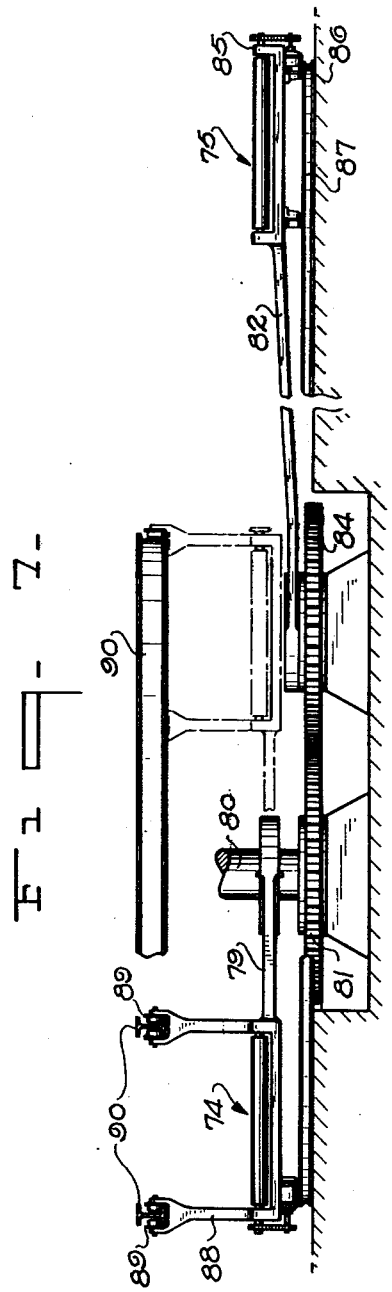
Inventor
John L. Drake.
By Frank Fraser
Attorney Patented Sept. 26, 1933

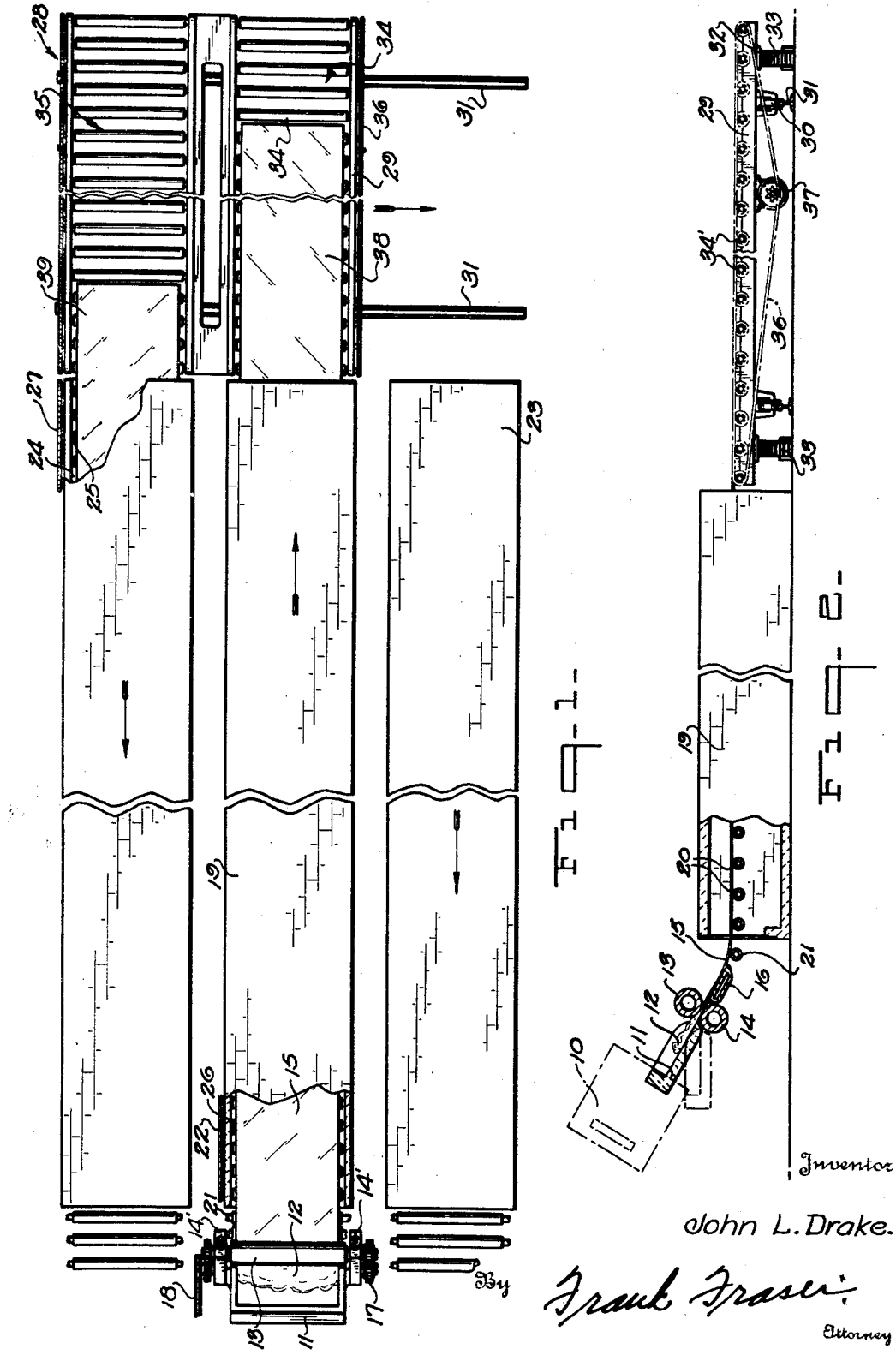

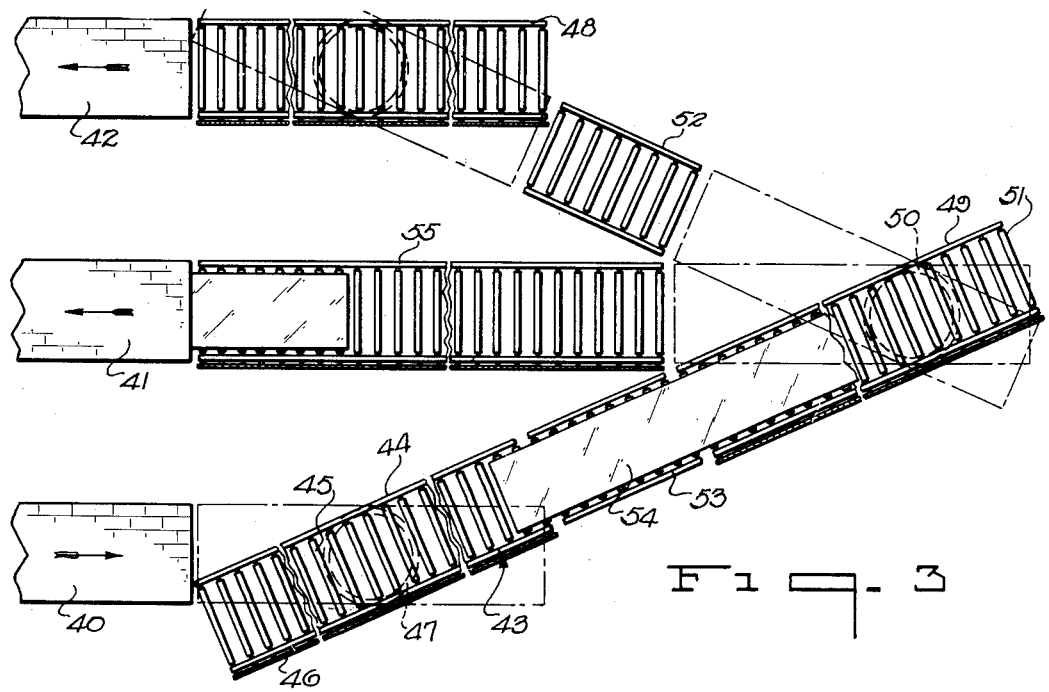
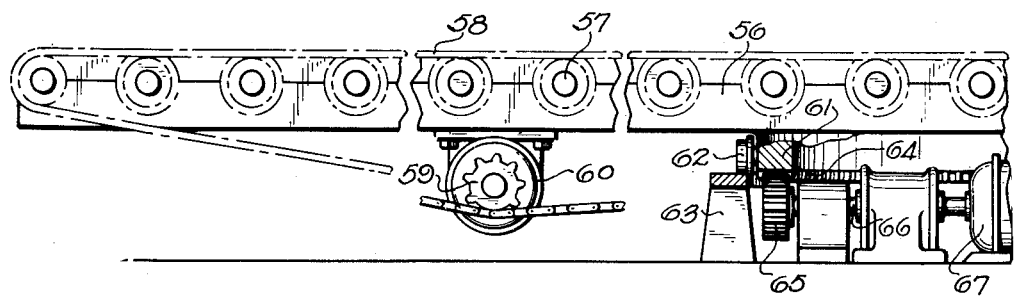

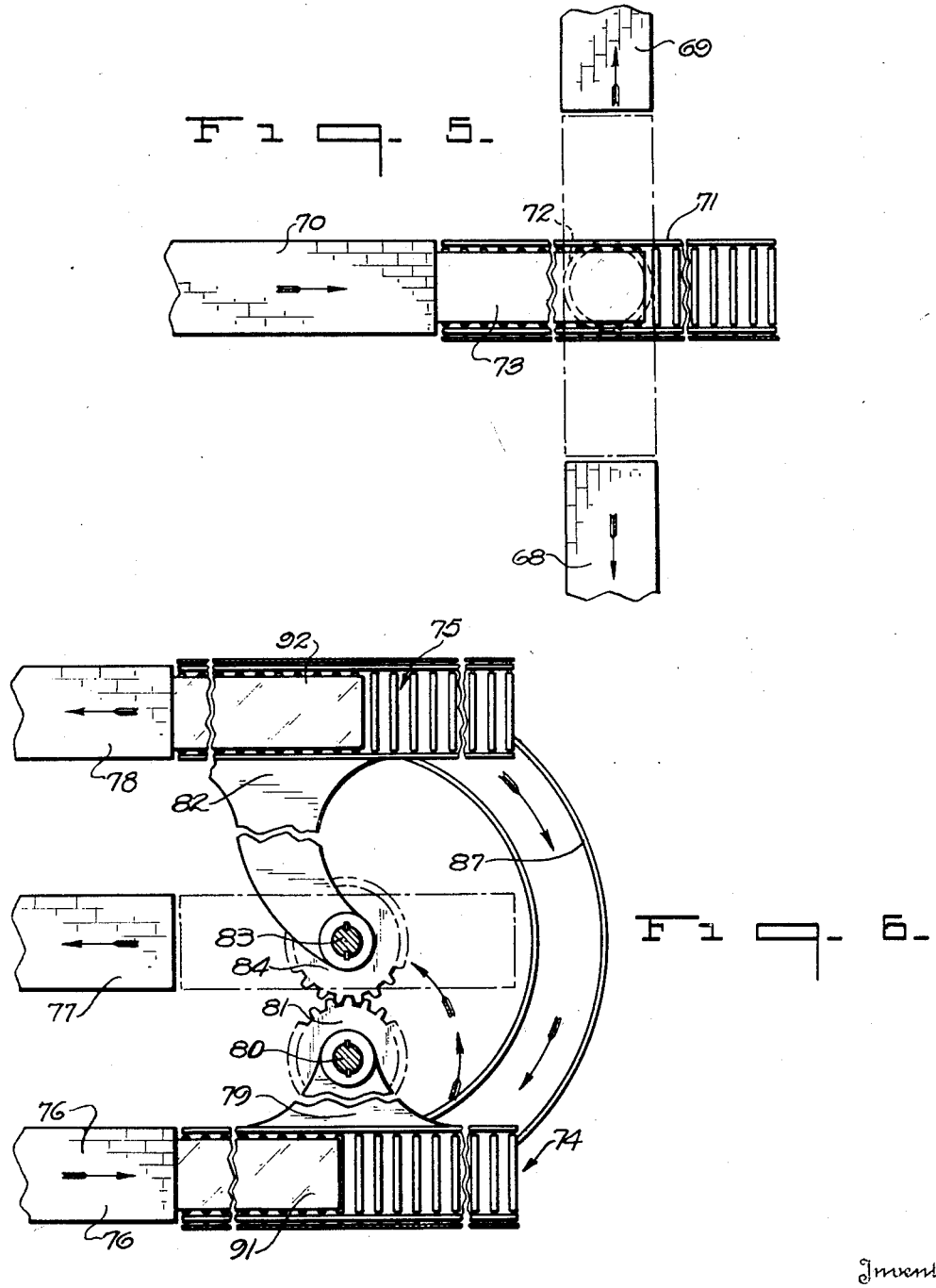

1,928,371

UNITED STATES PATENT OFFICE 1,928,371

PROCESS AND APPARATUS FOR PRODUCING SHEET GLASS

John L. Drake, Toledo, Ohio, assignor to Libbey-Owens-Ford Glass Company, Toledo, Ohio, a corporation of Ohio Application May 13, 1929. Serial No. 362,478

8 Claims. (Cl. 49—3)

The present invention relates to a process and apparatus for producing sheet glass.

An important object of the invention is to provide a process and apparatus whereby a mass of molten glass may be reduced to sheet form at a relatively high rate of speed, after which the sheet is annealed at the same speed to remove residual strains, the sheet then being passed through a cooling means at a relatively much slower speed to reduce the same to handling temperatures.

Another object of the invention is to provide means for accomplishing this result consisting of a single annealing leer arranged in alignment with the sheet forming mechanism whereby the sheet may be rolled and annealed at a relatively high rate of speed to effect removal of residual strains, the rolling and annealing speeds being substantially identical, and one or more cooling compartments for receiving the sheet after it has been annealed and for reducing the same to room temperatures.

A still further object of the invention is to provide a single annealing leer arranged in alignment with a suitable sheet forming mechanism and being provided with a series of rolls adapted to be driven at the same peripheral speed as the sheet forming means whereby the glass may be formed into a sheet at a relatively high rate of speed and annealed at the same speed while a plurality of cooling compartments are arranged in spaced relation to the annealing leer and also being provided with conveyor means but being adapted to be driven at a relatively much lower rate of speed than the annealing leer, the apparatus also including transfer mechanism for receiving the annealing sheet from the annealing leer and for moving the same into position where it may be moved into one of the cooling compartments and passed therethrough at a relatively low rate of speed to reduce the same to handling temperatures.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view illustrating one arrangement of the invention, Fig. 2 is a side elevation of the apparatus of Fig. 1 illustrating the sheet forming mechanism in section, Fig. 3 is a diagrammatic plan view illustrating a slightly modified form of transfer mechanism, Fig. 4 is an enlarged detail of one of the transfer devices, Fig. 5 is a plan view of another slightly modified transfer arrangement, Fig. 6 is a similar view of still another arrangement, and Fig. 7 is an elevation, partly in section, of the apparatus disclosed in Fig. 6.

Referring to the drawings, the numeral 10 in Fig. 2 designates a receptacle in which molten glass may be produced and refined.

As illustrated, the receptacle is in a tilted position for discharging molten glass therefrom to a support 11. During the transfer of the molten glass 12 from the receptacle to the support, however, the support is preferably positioned in a substantially horizontal plane as illustrated in broken lines in Fig. 2. After the useful contents of the receptacle have been deposited upon the support, the receptacle is removed and the support is tilted as indicated in full lines. Associated with one end of the support 11 is a pair of rolls 13 and 14 arranged to create a sheet forming pass through which the molten glass 12 runs and is reduced to a sheet 15 of substantially predetermined and uniform thickness. A suitably temperature controlled slab 16 is arranged with one end near the forming pass so that the slab may receive the sheet as it is formed to direct the same away from the forming mechanism. The forming mechanism as illustrated is purely diagrammatic and it is to be understood that this invention is in no way restricted to any particular type of sheet rolling or other forming construction. Regardless of the type of forming mechanism employed, it is preferred that it be of such nature that the sheet may be formed at a relatively high rate of speed.

As shown in Fig. 1, the rolls 13 and 14 are adjustably supported at their ends by means of the brackets 14'. Intermeshing gears 17 are carried by the roll shafts, while a drive chain 18 connected to a suitable source of power at one end and to one of the roll shafts at the other is provided to positively rotate the rolls. By reason of the intermeshing gears 17, the rolls will be positively driven in opposite directions.

An annealing leer, designated in its entirety by the numeral 19, is mounted in horizontal alignment with the sheet forming pass and the annealing leer is provided with conveyor means such as rolls 20 illustrated more clearly in Fig. 2.

As many rolls 21 as required may be positioned between the discharge end of the slab 16 and the intake end of the leer 19 to prevent sagging of the sheet. It will also be noted that the sheet is deflected from a downwardly inclined plane into a horizontal plane in its passage from the slab to the annealing leer.

A drive mechanism 22 is used to rotate the rolls 20, and it is preferred that the driving means for the rolls be synchronized with the driving means for the forming rolls so that the peripheral speed of the forming rolls and the leer rolls will be substantially identical. The length of the leer 19 is such that the sheet will be free of residual strains when reaching the outlet end thereof after having passed through said leer at the sheet forming speed. By way of example, it is mentioned that the sheet may be rolled and annealed at the rate of sixty feet per minute, although obviously the sheet may be run faster or slower than this speed. However, the speed of movement of the sheet and the length of the leer together with the temperature control thereof is such that all residual strains will be removed from the sheet by the time it reaches the end thereof.

Although the sheet is annealed when leaving the leer 19, nevertheless it is far from being cool enough to handle. Its temperature may even be as high as 900° F. at this point. In Fig. 1, on each side of the leer 19 is a cooling chamber 23 and 24 respectively. Each of these cooling chambers is provided with a series of rolls 25 which may be similar in construction to the leer rolls 26. Drive means 27 are associated with the rolls and it is preferred that the rolls 25 be operated at a materially lower speed than the leer rolls 26. The construction of the cooling compartment 23 is the same as for 24.

To effect transfer of the sheet from the annealing leer to either one of the cooling compartments, conveyor means designated in its entirety by the numeral 28, is used. The conveyor means, as shown in Fig. 2, consists of a truck 29 supported on the wheels 30 movable on the transversely arranged rails 31. The truck may be provided with rack bars 32 with which mesh drive pinions 33. With this construction, the truck may be operated along the rails 31 which, as shown, are transversely arranged with respect to the annealing leer and cooling compartments.

Carried by the truck 29 are two series of rolls 34 and 35. The series of rolls 34 and 35 are spaced apart the same distance as the annealing leer and cooling chambers, and it is to be noted that the chamber 23 is spaced apart from the leer 19 the same distance as the cooling chamber 24. All of the rolls of a unit on the truck 29 may be operated simultaneously by means of a drive chain 36 driven by the motor 37 carried by the underside of the truck. A proper flexible cable is connected to the motor and a source of supply so that movement of the truck will not effect operation of the motor. A remote controlling device may be provided for operating both the truck as a whole transversely of the annealing leer and also of the individual series of rolls 34 and 35.

With the construction shown in Figs. 1 and 2, the sheet 15 is rolled out at a high rate of speed and passed through the leer at the same rate of speed. Likewise the sheet issues from the leer at the rolling speed and is received upon the series of rolls indicated at 34'. After the sheet 38 is entirely supported upon the conveyor 34, the motor 37 driving this conveyor may be stopped and the drive pinions 33 operated to move the conveyors transversely of the leer. During the time that the sheet 38 is passing onto the conveyor 34, the previously annealed sheet 39 is being moved from the conveyor 35 into the cooling compartment 24. The conveyor 34, during the time that it is in alignment with the leer 19, is operated at the annealing leer speed. On the other hand, while the conveyor 35 is in alignment with compartment 24, the rolls of this conveyor are operated at the cooling chamber speed. It is, of course, obvious that the conveyors 34 and 35 are provided with variable speed drives to permit a variation in the peripheral speed of the rolls. After the sheet 39 has left the conveyor 35 and the sheet 38 is entirely supported upon the conveyor 34, the truck 29 is moved in the direction of the arrow indicated in Fig. 1 to bring the conveyor 34 into alignment with the cooling chamber 23, while at the same time the other conveyor will now be brought into alignment with the annealing leer. The truck is in the position illustrated in Fig. 1.

In Fig. 3, the numeral 40 designates the annealing leer, while 41 and 42 designate the cooling compartments. The transferring mechanism for the sheet in this figure is slightly modified. Associated with the outlet end of the leer 40 is a conveyor 43. This conveyor may comprise a frame 44 provided with a series of rolls 45 driven by means of a sprocket chain 46 trained about sprockets carried on the ends of the rolls. The conveyor 43 is indicated in dotted lines in the position it assumes when a sheet is passing from the leer thereon. It will be noted that the conveyor 43 is pivotally mounted on the means indicated by dotted lines and designated by the numeral 47. The constructional details of this will be discussed more fully hereinafter. Suffice it is to say at this time that the support for the conveyor is of such character that it may be arranged in horizontal alignment with the annealing leer and also swung out of alignment therewith.

The cooling chamber 42 is likewise provided with a conveyor 48 which is of the same construction as the conveyor 43 and capable of being operated in the same manner. As the conveyor 41 is in the center of this lay-out, a conveyor 49 is pivotally mounted as at 50 in horizontal alignment with the cooling chamber 41. The conveyor 49 is also provided with the series of positively driven rolls 51 and is adapted to be swung about its support into either of the positions indicated by broken lines or the position shown by full lines. The numerals 52 and 53 designate stationary conveyors, and it will be seen that the conveyors 43, 53, and 49 are all in alignment during the travel of the sheet 54 thereon. As the conveyors 55 are in horizontal alignment with the central compartment 41 and also the point of pivot 50, they may be mounted on stationary supports as there is no necessity for their being moved.

In Fig. 4 will be seen the structural details of the pivotal support and drive means for the various movable conveyors above described. The conveyor numbered 56 in Fig. 4, for sake of convenience, is provided with the rotatable rolls 57 driven by the sprocket chain 58 operated by the sprocket 59 driven by the motor 60 carried by the underside of the truck 56. An annular ring member 61 depends from the underside of the truck 56 and is provided with wheels 62 adapted to be supported upon and moved on the annularly arranged track 63. The bottom of the ring 61 is provided with a suitable rack adapted for engagement with the drive pinion 65 which is carried on the journaled shaft 66 driven by the motor 67. Upon rotation of the gear 65, it will be seen that the conveyor will be moved on the wheels 62 about the track 65.

In operation, the sheet is annealed in the leer 40 and at a relatively high rate of speed as in the case of the construction in Fig. 1. When the sheet is to issue from the leer, the conveyor 43 is moved into the position indicated by dotted lines so that it will be in horizonal alignment with the leer. At this time the rolls of this particular conveyor are operated at the annealing leer speed. As soon as the entire sheet is supported upon the conveyor, the drive for the rolls may be stopped or materially reduced. At any rate, the conveyor is swung about into alignment with the stationary conveyor 53, while the movable conveyor 49 is also swung into alignment with the stationary conveyor and likewise the conveyor 43. The sheet may then be transferred over onto the conveyor 49 which in turn may be moved into alignment with the conveyors 55 and the sheet passed into the cooling chamber 41 or into alignment with the stationary conveyor 52. If it is swung into the latter mentioned position, the conveyor 48 is likewise moved into alignment with the conveyor 52 and the sheet is then moved onto the means 48, after which it is then moved into horizontal alignment with the cooling chamber 42 and the sheet passed thereinto. It will be readily seen how the sheets can be moved from the annealing leer into first one of the cooling chambers and then into the other. All of the control means for operating the various conveyors and supports therefore may be placed at one position and handled by one operator.

In Fig. 5 the cooling chambers 68 and 59 are positioned at right angles to the annealing leer 70. A single rotatable conveyor 71 can be used to effect transfer of the sheet from the annealing leer to either of the two cooling compartments. The pivotal support 72 for the conveyor 71 and drive mechanism therefore are identical with the construction shown in Fig. 4. The annealing leer and two cooling chambers are so positioned that the conveyor can be swung into operative association with all three. The sheet 73 is passed from the annealing leer when the conveyor 71 is arranged as shown in heavy lines. After the entire sheet is so supported, the conveyor is moved about its support and swung into alignment with the two cooling compartments 68 and 69. By driving the rolls in either one direction or the other, the sheet may be fed into either of the cooling chambers.

In Fig. 6 two pivotally mounted conveyors 74 and 75 are used to transfer the sheets from the annealing leer 76 to either of the cooling compartments 77 or 78. The conveyor 74 is mounted on a relatively short arm 79 keyed to the vertical shaft 80. This construction is illustrated in Fig. 7, and it will be seen that the shaft 80 is also provided with a gear 81. The conveyor 75 is carried on a relatively long arm 82, the arm 82 being keyed to the shaft 83 which also carries the gear 84 meshing with the gear 81. The conveyor 75 is mounted on a truck 85 supported on the wheels 86 adapted to run on the curved track 87. The track 87 runs from the annealing leer 76 around to the cooling compartment 78 and therefore the shaft 83 is mounted at a point equidistant from these chambers.

The conveyor 74 is carried by an overhead support and as shown in Fig. 7, the vertical members 88 carry the wheels 89 which ride on the overhead track 90. The overhead track 90 connects the annealing leer 76 and cooling compartment 77 so that the shaft 80, which serves as a point of pivot, is mounted between these two compartments. Either one of the shafts 80 or 83 may be connected to a suitable source of power, and upon rotation of one of these shafts, both gears will operate in opposite directions. As shown in Fig. 6, the conveyor 74 is in position to receive the sheet 91 from the annealing leer 76, while the conveyor 75 is in position to discharge the sheet 92 into the cooling compartment 78. Upon operation of the gears, the conveyor 74 will be swung about the shaft 80 and will assume the position indicated by dotted lines in horizontal alignment with the cooling compartment 77. While the conveyor 74 is following this path as indicated by the arrows, the conveyor 75 will be swung away from the compartment 78 and into sheet receiving position with respect to the annealing leer. Upon further operation of the gears in the opposite direction, the conveyors will be swung to the positions illustrated in heavy lines.

In all cases hereinabove described, the annealing leer is operated at the sheet forming speed so that the sheet of glass may be formed at a relatively high rate of speed and annealed at the same speed. That is, the sheet, when leaving the annealing leer, is free of residual strains, although it is not at a proper handling temperature. The sheet, after it has been annealed, is passed from the leer and transferred to a cooling chamber through which it moves and is gradually reduced to handling temperatures. It is also preferred that the speed of the sheet through the cooling compartment be considerably less than its speed through the annealing leer. Cooling devices may be arranged in the cooling compartments to assist in reducing the sheets to handling temperatures, and for this purpose heat absorbing shields may be mounted transversely at spaced intervals throughout the said compartments.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a horizontal annealing leer, a cooling chamber disposed at one side of the leer and extending substantially parallel therewith, a rolling machine associated with the intake end of the leer and in substantial alignment therewith, means for operating the rolling machine to effect formation of the sheet at a relatively high rate of speed, conveying means within the leer for receiving and carrying the sheet therethrough, means for driving said conveying means at a relatively high speed substantially equal to the speed of formation of said sheet, conveying means within the cooling chamber for supporting and carrying the sheet therethrough, means for driving said second mentioned conveying means at a speed relatively less than the speed of formation of the sheet, conveyor means at the exit end of the leer for receiving the sheet therefrom and delivering it into the entrance end of the cooling chamber, means for moving said conveyor means first into cooperative relation with respect to the annealing leer and then into cooperative relation with respect to the cooling chamber, and means for driving the conveyor means first in one direction at a relatively high speed to receive the sheet from the annealing leer and then in the opposite direction at a relatively slower speed to deliver said sheet into the cooling chamber.

2. In sheet glass apparatus, means for rolling a mass of molten glass to sheet form at a relatively high rate of speed, an annealing leer, conveying means within said leer for receiving and carrying the sheet therethrough, means for driving said conveying means at a relatively high speed substantially equal to the speed of formation of said sheet, a cooling chamber disposed in substantially the same horizontal plane as the annealing leer but extending in a different direction, conveying means within said cooling chamber for supporting and carrying the sheet therethrough, means for driving said second mentioned conveying means at a speed relatively less than the speed of formation of the sheet, conveyor means interposed between the exit end of the annealing leer and the entrance end of the cooling chamber for effecting the transfer of the sheet from the former into the latter, and means for driving said last mentioned conveying means first in one direction at a relatively high speed to receive the sheet from the annealing leer and then in the opposite direction at a relatively slower speed to deliver said sheet into the cooling chamber.

3. The process of producing sheet glass, consisting in rolling a mass of molten glass to sheet form at a relatively high rate of speed, carrying the sheet continuously forwardly at such speed into and through an annealing zone to remove residual strains therefrom, shifting the sheet transversely of its direction of travel, and in then passing said sheet continuously in the opposite direction and in substantially the same horizontal plane at a relatively slower speed through a cooling zone.

4. The process of producing sheet glass, consisting in rolling a mass of molten glass to sheet form at a relatively high rate of speed, carrying the sheet continuously forwardly at such speed into and through an annealing zone upon constantly shifting separated lines of transverse support to remove residual strains therefrom, shifting the sheet transversely of its direction of travel, and in then carrying the sheet continuously forwardly in the opposite direction and in substantially the same horizontal plane upon constantly shifting separated lines of transverse support through a cooling zone at a relatively slower speed.

5. In sheet glass apparatus, means for rolling a mass of molten glass into sheet form at a relatively high rate of speed, an annealing leer, movable conveying means within said leer for receiving the sheet as it is formed from the rolling means and conveying it continuously forwardly through the leer at a speed substantially equal to its speed of formation, a cooling chamber disposed in substantially the same horizontal plane as the annealing leer but extending in a different direction, movable conveying means within said cooling chamber for supporting and carrying the glass sheet continuously forwardly therethrough at a speed relatively less than its speed of formation, and movable conveying means for receiving the sheet from the movable conveying means within the leer and transferring it to the movable conveying means within the cooling chamber.

6. In sheet glass apparatus, a horizontal annealing leer, a cooling chamber disposed at one side of said leer and extending substantially parallel therewith, a rolling machine associated with the intake end of the leer for reducing a mass of molten glass to sheet form, movable conveying means within the leer for receiving the sheet as it is formed from said rolling machine and conveying it continuously forwardly through the leer at a speed substantially equal to its speed of formation, movable conveying means within said cooling chamber for supporting and carrying the glass sheet continuously forwardly therethrough at a speed relatively less than its speed of formation, and movable conveying means at the opposite end of the leer for receiving the sheet from the movable conveying means within said leer and delivering it to the movable conveying means within said cooling chamber.

7. In sheet glass apparatus, a horizontal annealing leer, a cooling chamber disposed at one side of said leer and extending substantially parallel therewith, a rolling machine associated with the intake end of the leer for reducing a mass of molten glass to sheet form, movable conveying means within the leer for receiving the sheet as it is formed from said rolling machine and conveying it continuously forwardly through the leer at a speed substantially equal to its speed of formation, movable conveying means within said cooling chamber for supporting and carrying the glass sheet continuously forwardly therethrough at a speed relatively less than its speed of formation, movable conveying means at the opposite end of the leer for receiving the sheet from the movable conveying means within said leer and delivering it to the movable conveying means within said cooling chamber, and means for actuating said third-mentioned movable conveying means to bring the same first into cooperative relation with the exit end of the leer and then into cooperative relation with the entrance end of the cooling chamber.

8. In sheet glass apparatus, a horizontal annealing leer, a cooling chamber disposed at one side of said leer and extending substantially parallel therewith, a rolling machine associated with the intake end of the leer for reducing a mass of molten glass to sheet form, movable conveying means within the leer for receiving the sheet as it is formed from said rolling machine and conveying it continuously forwardly through the leer at a speed substantially equal to its speed of formation, movable conveying means within said cooling chamber for supporting and carrying the glass sheet continuously forwardly therethrough at a speed relatively less than its speed of formation, movable conveying means at the opposite end of the leer for receiving the sheet from the movable conveying means within said leer and delivering it to the movable conveying means within said cooling chamber, and means for driving said third-mentioned movable conveying means first in one direction to receive the sheet from the annealing leer and then in the opposite direction to deliver it into the cooling chamber.

JOHN L. DRAKE.